United States Patent Office 3,510,262
Patented May 5, 1970

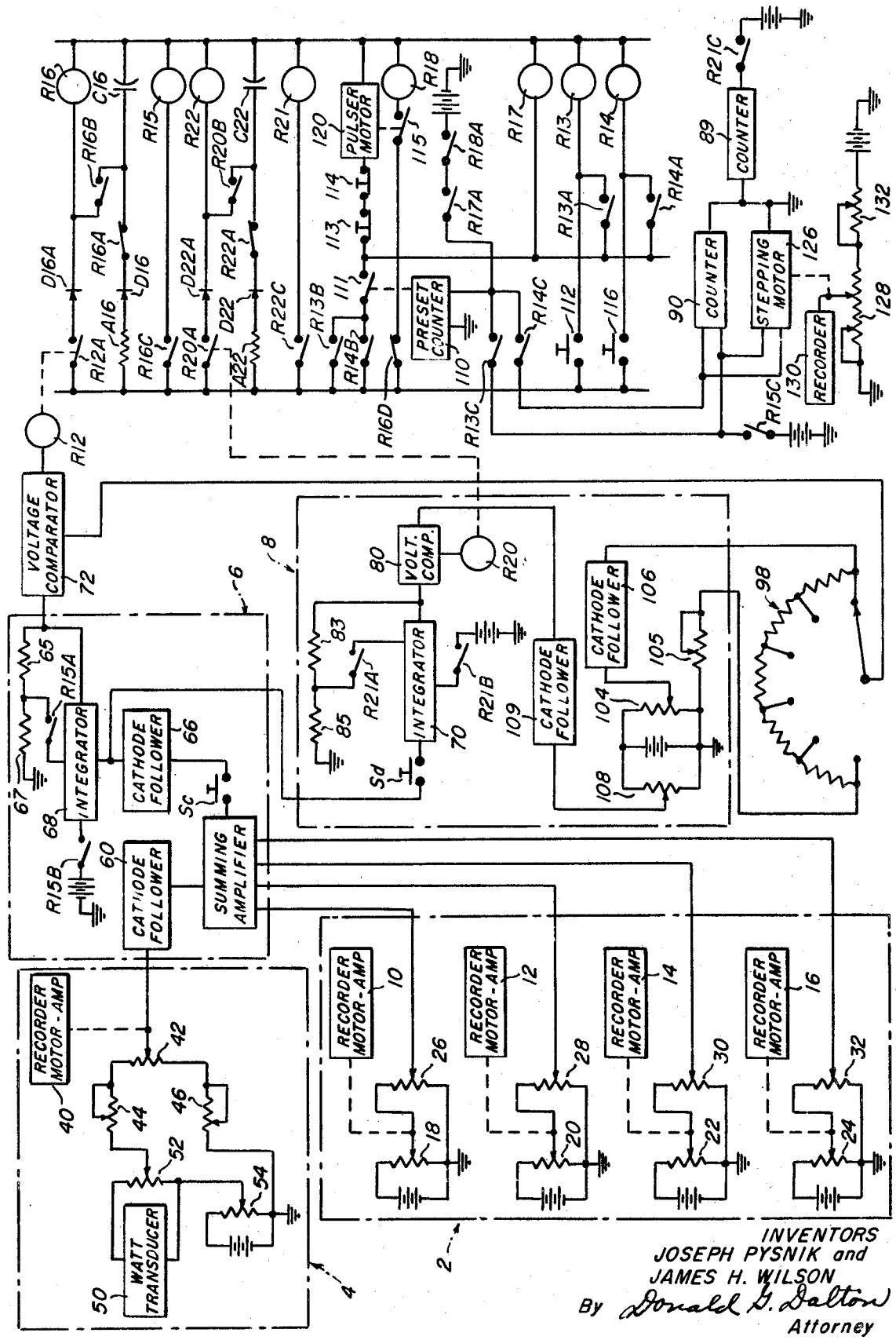

3,510,262
CARBON ANALYZING SYSTEM
Joseph Pysnik, Monroeville, and James H. Wilson, Franklin Township, Westmoreland County, Pa., assignors to United States Steel Corporation, a corporation of Delaware
Filed Sept. 16, 1966, Ser. No. 579,988
Int. Cl. C21c 7/00; G05b 15/00
U.S. Cl. 23—253         5 Claims

ABSTRACT OF THE DISCLOSURE

An apparatus for determining the carbon content of a heat of steel in a fuel fired furnace having a means to determine the rate of carbon input via the fuel, and a means to determine the rate of carbon output leaving the furnace via the off gases. A means is provided to integrate with respect to time the difference between the output rate and the input rate to obtain a first analogue signal proportional to the total weight of carbon lost. Another means is provided to obtain a second analogue signal proportional to the metallic charge weight in the furnace. Another means receives the first and second signals and compares them to issue a digital signal proportional to the ratio of weight of carbon leaving the furnace to the metallic charge weight which is the same as the percent carbon reduction of the bath.

---

This invention relates to an improvement in a system for determining the amount and percent carbon present in a metal bath during refining thereof. More particularly, the invention concerns a system useful to obtain the carbon content of a heat of steel in a fuel fired furnace such as an open hearth. Still more particularly, the invention relates to an improved system for accomplishing such determination on a continuous basis and to determine the weight of the bath as well.

Systems have been proposed for determining the carbon content continuously in the bath of metal in a fuel fired furnace during a refining period. In such systems, the quantity of carbon leaving the furnace in the waste gas, usually as $CO_2$, is a direct function of the carbon entering the furnace in the fuel, plus carbon being removed from the molten metal bath. Thus, the rate of carbon drop in a heat of steel, for example, may be expressed as the difference between the rate of carbon output via the exhaust gases, and the rate of carbon input, via the fuel. The carbon analysis may then be obtained in the following manner:

(1) The rate of carbon input is determined from analysis and fuel flow rate.

(2) The rate (weight per unit time) of carbon leaving the furnace is measured by the $CO_2$ content of the waste gases, converting to percent carbon by weight, and then multiplying this value by the mass flow rate to obtain the rate of carbon loss.

(3) The difference between these two rates is then integrated with respect to time to give the total pounds of carbon removed from the bath and the carbon loss is then obtained by dividing the weight of the metallic bath into the total pounds of carbon removed from the bath. Conventional carbon tests by chemical analysis of bath samples may be used as the starting point at the beginning of each run and to periodically up-date the calculations.

The invention will be more fully understood by reference to the accompanying drawing which is a circuit diagram for a system suitable for carbon analysis and bath weight determination in accordance with the invention described herein.

The system shown in the figure includes a fuel rate circuit 2, an off gas analyzer and mass flow circuit 4, a carbon determining circuit 6 and a metallic-bath-weight determining circuit 8. The fuel rate circuit determines the rate of carbon entering the furnace by way of the fuel and the exhaust gas circuit determines the rate that carbon is leaving the furnace. The carbon-determining circuit performs the necessary calculations to determine the amount of carbon lost, the percent carbon reduction and the percent carbon remaining in the bath. The metallic-determining circuit determines the weight of the bath.

FUEL RATE CIRCUIT

As shown in the accompanying drawing, the mass flow rate of input fuels is measured by standard flow meters and recorders 10, 12, 14 and 16 (such as Model T/37 and M/45 manufactured by Foxboro, of Foxboro, Mass.). An electrical signal proportional to the volume flow rate pressure of the fuel is obtained from the recorders either directly or by the use of retransmitting slidewires of resistors 18, 20, 22 and 24. Each slider is positioned along the resistor by the motor associated with the respective flow rate meter and recorder. One end of each of resistors 18, 20, 22 and 24 is connected to ground and the other is connected to a source of potential, e.g., a power supply, as shown. The negative terminal of the power supply is connected to one end of resistors 26, 28, 30 and 32 and to ground. Also, the resistors 26, 28, 30 and 32 are connected to the sliders of resistors 18, 20, 22 and 24 respectively.

With this arrangement, the voltage between the sliders of the aforementioned resistors 18, 20, 22 and 24, and ground, and the voltage across the resistors 26, 28, 30 and 32 are proportional to the mass fuel rate (rate of fuel flow per unit of time). Since the percent carbon and the density of the particular fuel being used are known, the setting of the sliders of resistors 26, 28, 30 and 32 may be made in accordance with the product of the percent carbon in the fuel and the density of the fuel. The sliders can be moved in accordance with increased product of the percent carbon and the density of the fuel. By operating in this manner, the voltage appearing at the sliders of resistors 26, 28, 30 and 32 is proportional to the fuel rate, fuel density and percent carbon in the fuel. This voltage is also proportional to the mass flow rate of carbon entering the furnace in the fuel. For example, the units of which would be gallons per unit of time, times pounds per gallon, times percent carbon.

CARBON IN WASTE GAS

The amount of carbon leaving with the waste gas per unit of time is obtained by first determining the percent carbon dioxide by volume through the use of a conventional gas analyzer 40. Such an analyzer may be a Lira 200 Infrared Analyzer, available from Mine Safety Appliance Company, Pittsburgh, Pa. Since the gas is comprised of $CO_2$, $O_2$ and $N_2$, the percent carbon by weight can be continuously calculated from the percent $CO_2$ using the following equation:

$$\text{Percent } C_{wt} = \frac{3CO_2}{4CO_2 + 7} = \frac{3}{4 + 7/CO_2 \text{ (vol.)}}$$

This calculation is implemented in the following manner. The percent carbon by weight vs. the percent $CO_2$ by volume relationship is manually calculated over the expected range of $CO_2$. By using a retransmitting slidewire 42 and two trimmer resistors 44 and 46, the voltage appearing at the slider 42, which is positioned by the recorder motor or analyzer 40, is proportional to the percent carbon by weight. For example, the range of $CO_2$ in the waste gas would typically vary between 5 and 15%.

By using the above equation, the percent carbon by weight will in this example vary linearly from 2.083 to 5.921%. Therefore, when the voltage is placed across resistors 42, 44 and 46, variable resistors 44 and 46 are adjusted so that 2.083% of the applied voltage appears at the slider of resistor 42 when the analyzer reads 5% $CO_2$ and 5.921% of the applied voltage appears at the slider when the analyzer is at 15%. Thus, the voltage at the slider will vary from 2.083 to 5.921% of the total voltage applied across resistor 42 as the analyzer varies from 5 to 15% $CO_2$.

MASS FLOW

The mass flow of waste gas may be determined by several methods. One method is to develop a relationship between the mass flow of the gas and the induced draft fan power that is required to move the gas. By means of a watt transducer 50 which may be Style 347A015H02, No. 63–1600 manufactured by Westinghouse Electric Corporation, Pittsburgh, Pa., in the fan motor power lead, a direct current voltage that is proportional to the power used by the fan in moving the waste gas can be obtained across a potentiometer 52. Potentiometer 54 and an associated potential provide a means for raising or lowering the base voltage of potentiometer 52. This resultant voltage is proportional to the mass flow of waste gas moving through the stack, i.e. pounds of gas per unit of time. If this voltage is placed across resistors 42, 44 and 46, the voltage at the slider of resistor 42 is then proportional to the total pounds of carbon per unit of time leaving the furnace by way of the waste gas.

BATH CARBON DROP

The improvement in carbon analyzing systems in accordance with this invention pertains to the conditioning of the signal related to the rate of carbon leaving the furnace. The conditioning of this signal is such that the analog signals are converted to a digital pulse that directly operates a readout counter. A readout recorder is also operated to yield an analog history of the carbon drop.

The instantaneous rate of carbon drop (pounds of carbon per unit of time) is determined by subtracting the voltages of the sliders of resistors 26, 28, 30 and 32 which are proportional to the rate of carbon entering the furnace by means of the fuel from the voltage at the slider of resistor 42 which is proportional to the rate of carbon leaving the furnace in the waste gas.

The signal on the slider of resistor 42 is fed into a cathode follower circuit 60 (such as a Type 19105 manufactured by Consolidated Electrodynamics Corp. of Bridgeport, Conn., hereinafter referred to as CEC) to protect against slidewire loading. The output of cathode follower 60 is also proportional to the rate of carbon leaving the furnace in the waste gas.

These voltages are summed in an adder-subtracter device 62 which may be a conventional summing amplifier such as Type 19301 manufactured by CEC. The output of the adder-subtracter device 62 is a voltage proportional to the net mass flow rate of carbon being removed from the liquid metal bath, e.g. steel, in pounds of carbon per unit of time. The output signal of the adder-subtracter 62 is connected to other circuitry as hereinafter described by switch $S_c$ which the operator turns when he wishes to start this computation. After passing through this switch, the signal enters another cathode follower 66 (similar to device 60) which is used as a loading buffer, the output of which is fed directly into integrator 68 which may be Type 19407 manufactured by CEC, and also another switch $S_d$ into integrator 70 (similar to 68). Switch $S_d$ is operated when the total pounds of carbon leaving the bath is to be obtained. The output of integrator 68 is a voltage proportional to the total amount (e.g. in pounds) of carbon that has left the bath. To be of most use to the operator, the total pounds of carbon loss must be converted to percent carbon remaining in the bath. This is accomplished by using a voltage comparator 72 such as Type 19501 manufactured by CEC, relays R12, R15, R16, and an add-subtract counter 90, and A-C relays R13 and R17 which will be later described.

Relays R12 and R20 (discussed below) may be Type 221888–02 manufactured by CEC; all A-C relays are Type 105A manufactured by Milwaukee Relay Co., Milwaukee, Wis. Relays R16 and R22 are Model No. KRP–11DN manufactured by Potter and Brumfield, Princeton, Ind.

A figure representing the weight of metallics in the bath is known to the furnace operator since it is written on the heat record card before the charge is placed in the furnace. A voltage proportional to the weight is set by the furnace operator by adjusting a calibrated switch 98. This voltage which is generated through a D-C source, potentiometer 104, cathode follower 106 and potentiometer 105 is fed to one of two inputs of voltage comparator 72. Cathode follower 106 is similar to device 60. The remaining input of voltage comparator 72 receives the output of integrator 68 described above. By properly fixing the polarity of these input voltages the output of voltage comparator 72 remains at zero until the integrator 68 voltage increases to the same magnitude but opposite polarity of the voltage that is fixed by switch 98. When these voltages are equal but opposite the comparator output changes from zero volts to 10 volts causing relay R12 to operate. When relay R12 operates, it operates relays R16 and R15. Relay R16 is used as a delaying device for relay R15. The delay is accomplished with the aid of a current limiting resistor A16, rectifying diode D16 and storage capacitor C16. Normally, the capacitor C16 is charged through resistor A16, diode D16 and the normally closed contact R16A. When relay R16 coil is energized by closure of contact R12A, the charge on capacitor C16 is forced into the coil of R16 through the normally open contact of R16B which is now closed. Diode D16A is used as a blocking diode so that the capacitor charge is forced through the relay coil instead of leaking through another loop. Contact R16C is used to operate relay R15, thus causing relay R15 to be delayed. Likewise, when the capacitor charge leaks below the hold-in-voltage of the relay R16, the relays R16 and R15 will become de-energized. The circuits involved in relays R22 and R21 are similar to R16 and R15, respectively. This action causes the integrator 68 to be reset to zero via contacts R15A and R15B, the comparator 72 output to return to zero, the relays to de-energize and the add-subtract counter 90 such as Model 6285 manufactured by Wittaker Corp. of North Hollywood, Calif., to subtract, due to relay contact R15C. Relay contacts R15A and R15B are used to reset integrator 68. This is done by applying a positive potential to a relay contained in the integrator 68 which opens the input of the integrator to discharge the capacitor of the integrator through a low resistance path to ground. The low resistance path is through resistors 65 and 67. When relay R15 is de-energized as previously described, the latter's contacts open and the integrator resumes the normal operation. The third contact R15C of relay R15 closes and a positive potential is applied to the subtract coil of counter 90 which subtracts one count from the counter. The potential is removed when relay R15 is de-energized. Thus, points of carbon is obtained by dividing the pounds of carbon (output of integrator 68) by the charge metallics weight (obtained by operating switch 98). However, this division technique is different from the usual. Normally, points of carbon would be obtained by dividing the pounds carbon (e.g. 71 pounds) by the metallic charge weight of the bath (e.g. 710,000 pounds) to get a quotient of 0.0001 or 1 point of carbon. By use of proper scale fatcors, the comparator can recognize a unity ratio e.g. of 7.1 to 7.1 which can be used to define one point of carbon. Therefore, every time this ratio is reached, one point of carbon is registered and accumulated in the counter, the integrator is reset to zero, and the division continues. This manner of division is similar to division by continuous subtraction.

To convert the points of carbon lost to points carbon remaining in the bath, the carbon in the bath at the beginning of the analysis must be determined by some conventional method such as by chemical testing of the sample or an estimated value. This number is then set into a preset counter 110 such as Model No. TCEF4PE, manufactured by Sodeco of Geneva, Switzerland. When this step is completed, switch 112 is pushed causing R13 and R17 to be energized. It holds itself in through contacts R13B, switch 111 and R13A. When switch 112 is released, switch 113 closes causing pulser motor 120, such as Model TK2WI, maunfactured by Sodeco of Switzerland, to start running being fed power through R13B, 111, 113 and 114. While motor 120 is running, it is operating switch 115 which in turn is operating relay R18 through contact R16D. With R18 opening and closing the positive potential is fed through R17A, R18A and R13C into the counter 90 and preset counter 110. In this manner, the counter 90 is adding and the preset counter 110 is counting down from the number manually put in. When the preset counter 110 gets to zero, switch 111 opens removing power from R13, R17 and pulser motor 120. Relay R18 stops operating and pulses supplied to counter 90 have stopped.

Contact R16D is used to stop the pulser operation when a command from relay R12 is present. This action causes the calculated carbon drop to take priority over the addition of numbers. When the carbon drop is taken care of, R16D closes and the pulser continues adding as it was before the priority interruption. This also allows a true number to be displayed since it is the original carbon minus the points lost.

Whenever any number other than zero is in preset counter 110, an internal switch 111 is closed. When switch 112 is pushed, relays R13 and R17 are operated and switch 113 is opened. In this manner, pulser motor 120 and the add coil of counter 90 are on the verge of being energized except for a contact R18A or relay R18 which keeps a positive potential away from counter 90 and switch 113 which keeps a positive potential from pulser motor 120. When switch 112 is released, switch 113 closes and positive potential is applied to pulser motor 120. Relays R13 and R17 remain energized through a path consisting of two contacts R13A and R13B of relay R13 and switch 111. When the pulser motor 120 is energized, it rotates and opens and closes a self-contained switch 115 which in turn operates relay R18. The contact R18A of relay R18 now opens and closes causing a positive potential to be applied to and removed from the add coil of add-subtract counter 90 and the subtract coil of preset counter 110. Thus, as a pulse is put into counter 90 it is taken from counter 110. This action continues until counter 110 reaches zero. At this time, switch 111 opens, causing power to be removed from relays R13 and R17 which in turn opens the pulse transmitting paths.

Now as the points of carbon are subtracted as described, the number on display in the add-subtract counter is equivalent to the points of carbon remaining in the bath. During the melting operation, it is desirable that periodically a bath sample be taken for conventional chemical analysis for carbon. If the chemical analysis does not agree with the percent carbon indication provided, it is desirable for the purpose of a subsequent accurate analysis to correct the apparatus in accordance with the degree indicated by the chemical analysis.

The correction is accomplished in a manner similar to that of installing the original starting carbon in the counter 90. The error is placed into the preset counter 110 in the same fashion as a starting carbon. If the analysis shows a larger carbon than is shown by the apparatus, the error is added by pushing switch 112. This increases the reading in counter 90. Consequently, if the analysis reveals a smaller carbon content than shown, switch 116 is pushed. When switch 116 is pushed, the same thing happens as when switch 112 is operated. However, instead of relay R13 operating, relay R14 is operated. This causes the subtract coil of add-subtract counter 90 to be energized instead of the add coil of counter 90. Subtraction is accomplished in the same manner as previously described except switch 116 is pushed. Relay R14 replaces the role of R13.

An analog signal is generated and recorded to provide a rate diagram of the carbon drop. This also provides a permanent record for the heat. This signal is generated by using stepping motor 126, such as Model 2125–248–031, manufactured by Ledex of Dayton, Ohio (12 steps per revolution), a multi-turn potentiometer 128 (40 turns) and a recorder 130, such as Class 153 manufactured by Minneapolis-Honeywell of Minneapolis, Minn. The stepper motor 126 follows the counter 90. If the counter adds, the stepper motor changes the setting of the slider of potentiometer 128 to which it is mechanically coupled. The potentiometer is tapped at 360° (or 10 turns) and this tap is tied to ground along with the tap at 0°. This essentially provides ground potential on ten turns of the potentiometer which allows the stepper motor to go in the negative direction while the recorder which is coupled to the slider remains at zero. During the first part of measurement, negative points of carbon will be indicated because the chemical analysis of the starting carbon takes several minutes to be obtained. For the recorder to stay in step with the counter and because it is impractical to have a center zero recorder, the negative counts are ignored by the recorder (because of the grounded 10 turns) until such time as the points of carbon become positive. The potentiometer supply voltage is so calibrated by potentiometer 132 to provide for a carbon range of 0 to 250 points with a resolution of one point of carbon per division.

WEIGHT OF METALLICS IN THE BATH

In addition to knowing the rate of carbon drop and the remaining carbon in the liquid steel, a knowledge of the actual weight of metallics in the bath, i.e. the weight of recoverable metal components, is also important to the operator for the purpose of improving alloying and pouring practices.

When it is desired to make a weight calculation of the metallics in the bath, the operator must take a sample of the liquid steel and have it analyzed to determine the carbon content. At the same time that he takes the first sample, switch $S_d$ is operated. This couples integrator 70 to the output of cathode follower 66 which as previously mentioned is a voltage proportional to the net mass flow rate of carbon being removed from the liquid metal bath, e.g. steel, in pounds of carbon per unit of time. The output of integrator 70 then becomes a voltage that is proportional to the amount (in pounds) of carbon that is leaving the liquid bath.

The output of integrator 70 is fed into comparator 80. This comparator operates the same as that mentioned previously but in this case it is used only to convert an analog voltage to a digital signal. It also provides a scale factor of 10 for convenience. This is accomplished by applying 10 volts through potentiometer 108 and cathode follower 109 to the other input of comparator 80.

When comparator 80 changes state (goes from 0 volts to 10 volts) relay R20 is operated which in turn operates relays R21 and R22 through relay contact R20A. The latter relays reset integrator 70 and adds one count into counter 89, such as Model 6380, manufactured by Wittaker Corp. of North Hollywood, Calif., in the same manner as described in conjunction with relays R15 and R16. Relay R22 is used for delay similar to relay R16; therefore, functionally A22 is used like A16, D22 like D16, D22A like D16A and C22 like C16. A16, D16, D16A and C16 have been described before. Relay R21 is used to reset integrator 70 through resistors 83 and 85 similar to relay R15. The third contact, R21C of relay R21 connects positive potential to the add coil of counter 89 which adds one count to the counter. The number of counts stored in counter 89 multiplied by 100 represents the total pounds of carbon removed from the liquid steel metal bath.

At a later time, for example 10 to 15 minutes, the operator takes another sample from the bath and has it analyzed for carbon content. At the same time, switch $S_d$ is opened. This causes the input to integrator 70 to be decoupled from its input signal from the cathode follower 66. At this time, the integrator stops and the number stored in counter 89 (total pounds of carbon×100) multiplied by 100 is the total pounds of carbon that have left the liquid metal bath during the time period between the samples. By using this information, the operator may determine the weight of metallics in the bath by using the following equation:

$$W = \frac{E}{C_1 - C_2}$$

where:

W = weight of steel (metallics in the bath)
E = total pounds of carbon lost, measured between samples
$C_1$ = carbon content of first sampling
$C_2$ = carbon content of second sampling.

The present improved system employs inexpensive integrators without regard to long term stability because circuitry is designed with a feedback loop that corrects any integrator error every time a point of carbon is subtracted. The division is accomplished not by the use of a divider as in the previous systems but by a comparator that does three important things in an inexpensive manner. It changes an analog signal into a digital signal without the use of an expensive digital voltmeter. It indicates every time a point of carbon is removed from the bath by activating a counter. It resets the integrator which will reset any error that was introduced and this error will not be in the calculation of the subsequent carbon determinations.

The use of the comparator and feedback loop rather than an analog system allows inexpensive ruggedly-built mechanical counters to be used for indicating the carbon content to the operator. Because mechanical counters can be used, any corrections that have to be made to the displayed carbon can be done quickly and easily requiring very little time and as can be seen, scaling is not a problem because all the voltages occur within the design limits.

We claim:

1. In an apparatus for determining carbon loss from a molten metal bath in a fuel fired furnace employing carbonaceous fuel and from which off gases are withdrawn, having means for determining the rate of carbon input to the furnace in the fuel, means for determining the rate of carbon leaving the furnace in the off gases, the improvement comprising means for integrating with respect to time the difference between the rate of carbon input and the rate of carbon leaving the furnace to obtain a first analog signal proportional to the total weight of carbon lost, means to obtain and provide a second analog signal proportional to the metallic charge weight to the furnace, means to receive said first and second signals and to compare same and to issue a digital signal proportional to the ratio of weight of carbon leaving the furnace to the metallic charge weight which is the same as the percent carbon reduction of the bath.

2. An improved apparatus in accordance with claim 1 including means responsive to said digital signal to reset said integrating means to zero.

3. An improvement in an apparatus according to claim 1 wherein the carbon content of the bath is known, including means responsive to said digital signal to adjust the known carbon content of the bath to reflect changes in the carbon content by subtracting the percent carbon reduction from said known carbon content to thereby obtain the percent of carbon remaining in the molten metal bath.

4. An apparatus according to claim 1 comprising a voltage comparator adapted to receive said analog signal from said integrating means, means to obtain and provide an analog signal proportional to the metallic charge weight, a feedback loop between said voltage comparator and said integrating means to reset said integrator to zero when a unity ratio exists between the two analog signals, a points-of-carbon counter adapted to reflect the percent carbon content of the bath, relay means responsive to said voltage comparator to subtract, each time a unity ratio of analog signals exists, a known percentage of carbon from said counter so as to give an indication of carbon remaining in the bath.

5. An apparatus according to claim 1 comprising means to integrate the difference between said signals proportional to the carbon rate of input into the furnace in the fuel and the rate of carbon leaving the furnace in the off gases to obtain a first analog signal proportional to the total weight of carbon lost from the bath, voltage comparing means adapted to receive said first analog signal and a second analog signal of known and constant magnitude, a feedback loop between said voltage comparing means and said integrating means to reset said integrator to zero when a unity ratio exists between the two analog signals, a weight-of-carbon counter adapted to reflect the loss of carbon weight from the bath, relay means responsive to said voltage comparing means to add, each time a unity ratio of analog signals exists, a known quantity of carbon from said counter to give an indication of cumulative quantity of carbon which has left the bath.

References Cited

UNITED STATES PATENTS 3,181,343   5/1965   Fillon _____ 73—23 XR
3,329,495   7/1967   Ohta et al. _____ 73—23 XR

OTHER REFERENCES

Walker et al.: "Principles of Chemical Engineering" (1927), pp. 23–24.

Savas: "Computer Control of Industrial Processes," 1965, p. 23.

MORRIS O. WOLK, Primary Examiner

R. E. SERWIN, Assistant Examiner

U.S. Cl. X.R.

23—254; 73—23; 75—60